(12) United States Patent
Zhu et al.

(10) Patent No.: US 9,127,642 B2
(45) Date of Patent: Sep. 8, 2015

(54) METHODS FOR ADJUSTING THE POWER OUTPUT OF A WIND TURBINE

(75) Inventors: Guangyi Zhu, Shanghai (CN); Dong Wang, Shanghai (CN); Xiaoyun Zang, Shanghai (CN); Wei Zhu, Shanghai (CN)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 14/006,976

(22) PCT Filed: Mar. 29, 2011

(86) PCT No.: PCT/CN2011/000534
§ 371 (c)(1),
(2), (4) Date: Sep. 24, 2013

(87) PCT Pub. No.: WO2012/129721
PCT Pub. Date: Oct. 4, 2012

(65) Prior Publication Data
US 2014/0015252 A1 Jan. 16, 2014

(51) Int. Cl.
F03D 9/00 (2006.01)
H02P 9/04 (2006.01)
F03D 7/00 (2006.01)
F03D 7/02 (2006.01)
F03D 11/00 (2006.01)
B64C 11/00 (2006.01)
B64C 27/00 (2006.01)

(52) U.S. Cl.
CPC ............... *F03D 7/00* (2013.01); *F03D 7/0288* (2013.01); *F03D 11/0091* (2013.01); *F05B 2270/3032* (2013.01); *Y02E 10/722* (2013.01); *Y02E 10/723* (2013.01)

(58) Field of Classification Search
USPC .......................................... 290/44, 55; 416/1
See application file for complete search history.

(56) References Cited

U.S. PATENT DOCUMENTS

| | | | |
|---|---|---|---|
| 5,798,631 A * | 8/1998 | Spee et al. | 322/25 |
| 7,420,289 B2 * | 9/2008 | Wang et al. | 290/44 |
| 7,780,412 B2 * | 8/2010 | Zang et al. | 416/1 |
| 8,188,610 B2 * | 5/2012 | Scholte-Wassink | 290/44 |
| 8,779,611 B2 * | 7/2014 | Kabatzke et al. | 290/44 |
| 8,803,354 B2 * | 8/2014 | Wamble et al. | 290/55 |
| 8,941,253 B2 * | 1/2015 | Christiansen et al. | 290/44 |
| 8,977,401 B2 * | 3/2015 | Poulsen et al. | 700/287 |
| 2002/0029097 A1 | 3/2002 | Pionzio, Jr. et al. | |
| 2006/0273595 A1 * | 12/2006 | Avagliano et al. | 290/44 |
| 2008/0101916 A1 * | 5/2008 | Calley | 415/1 |
| 2008/0112807 A1 | 5/2008 | Uphues et al. | |

(Continued)

FOREIGN PATENT DOCUMENTS

| | | |
|---|---|---|
| EP | 1918581 A2 | 7/2008 |
| JP | 2004297892 A | 10/2004 |
| WO | WO 2007051464 A1 | 5/2007 |

*Primary Examiner* — Pedro J Cuevas
(74) *Attorney, Agent, or Firm* — Dority & Manning, P.A.

(57) ABSTRACT

A method for adjusting the power output of a wind turbine (10) based on component operating temperatures is disclosed. The method may generally include receiving a signal associated with an operating temperature of the wind turbine (402), determining a desired power output range of the wind turbine at the operating temperature (404), comparing a power output of the wind turbine to the desired power output range (406) and adjusting the power output when the power output is outside the desired power output range (408).

19 Claims, 8 Drawing Sheets

(56) References Cited

U.S. PATENT DOCUMENTS

| | | |
|---|---|---|
| 2010/0060000 A1* | 3/2010 | Scholte-Wassink ............ 290/44 |
| 2010/0143116 A1* | 6/2010 | Zang et al. ........................ 416/1 |
| 2011/0135473 A1* | 6/2011 | Singamsetti et al. ........... 416/61 |
| 2011/0291413 A1* | 12/2011 | Wamble et al. ................. 290/44 |
| 2012/0133152 A1* | 5/2012 | Wagoner et al. .............. 290/1 B |
| 2012/0148402 A1* | 6/2012 | Kabatzke et al. ................. 416/1 |
| 2013/0212410 A1* | 8/2013 | Li et al. .......................... 713/300 |
| 2013/0241209 A1* | 9/2013 | Andersen et al. ............... 290/55 |
| 2013/0272878 A1* | 10/2013 | Zhu ................................... 416/1 |
| 2015/0028590 A1* | 1/2015 | Wamble et al. ................. 290/43 |
| 2015/0056072 A1* | 2/2015 | Perley et al. ...................... 416/1 |
| 2015/0086356 A1* | 3/2015 | Perley et al. ...................... 416/1 |

* cited by examiner

METHODS FOR ADJUSTING THE POWER OUTPUT OF A WIND TURBINE

FIELD OF THE INVENTION

The present subject matter relates generally to methods for controlling a wind turbine and, more particularly, to methods for adjusting the power output of a wind turbine based on the operating temperatures of one or more wind turbine components in order to prevent damage to such components due to overheating.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

The wind turbine may also include various other components. For example, the wind turbine may include a generator, a turbine controller, cooling systems, associated electronics and various other components housed within the hub, nacelle and/or tower of the wind turbine. Such wind turbine components are generally subject to varying operating temperatures due to, for example, the heat generated by the wind turbine, itself, (e.g. during the power generation process) and seasonal changes to the ambient air conditions. Thus, wind turbine components are typically designed to operate over a predetermined range of temperatures. As a result, when excessive operating temperatures are achieved, wind turbine components may be subject to damage due to overheating.

Typically, to prevent damage due to overheating, a wind turbine is shut down when the operating temperatures within the turbine exceed a predetermined temperature value. However, such action results in significant down time for the wind turbine, thereby decreasing the overall efficiency and power output of the turbine.

Accordingly, a method for adjusting the power output of a wind turbine based on component operating temperatures that allows for the prevention of component overheating without shutting down the wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for adjusting the power output of a wind turbine based on component operating temperatures. The method may generally include receiving a signal associated with an operating temperature of the wind turbine, determining a desired power output range of the wind turbine at the operating temperature, comparing a power output of the wind turbine to the desired power output range and adjusting the power output when the power output is outside the desired power output range.

In another aspect, the present subject matter discloses a method for adjusting the power output of a wind turbine based on component operating temperatures. The method may generally include determining a power limitation rate of the wind turbine, generating a first power curve and a second power curve based on the power limitation rate and adjusting a power output of the wind turbine based on at least one of the first power curve and the second power curve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for adjusting the power output of a wind turbine based on the operating temperatures of one or more wind turbine components. For example, at high operating temperatures, the power output of the wind turbine may be reduced to prevent damage to the wind turbine component(s) due to overheating. Once the operating temperatures of such component(s) have reduced, the power output of the wind turbine may then be increased to normal operating levels. Thus, by continuously adjusting the power output of the wind turbine based on component operating temperatures instead of powering down the wind turbine at high operating temperatures, the overall efficiency and power output of the wind turbine may be increased.

Figure 1:
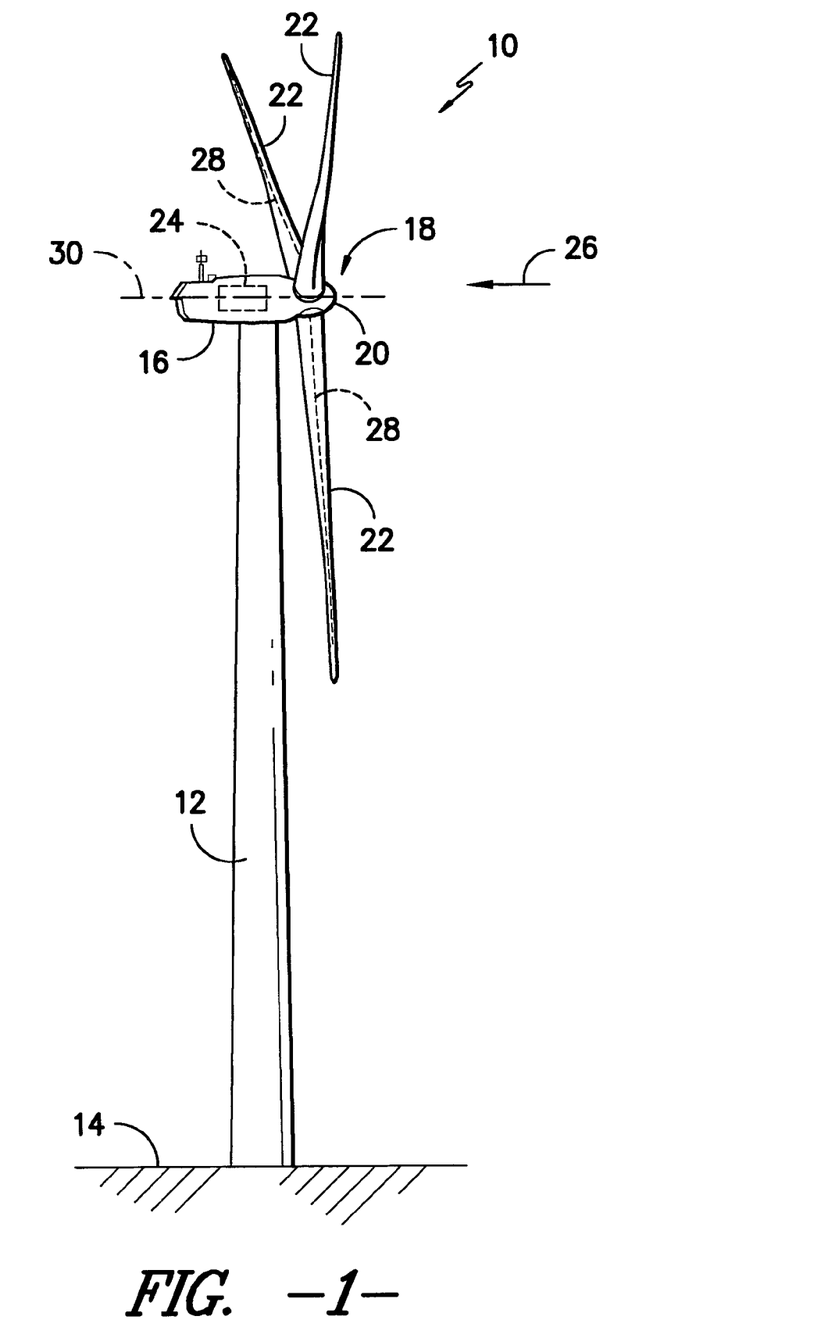
FIG. 1 illustrates a perspective view of one embodiment of a wind turbine.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 32 (FIG. 2) positioned within the nacelle 16 to permit electrical energy to be produced.

As shown, the wind turbine 10 may also include a turbine control system or a turbine controller 24 centralized within the nacelle 16. However, it should be appreciated that the turbine controller 24 may be disposed at any location on or in the wind turbine 10, at any location on the support surface 14 or generally at any other location. As will be described in detail below with reference to FIG. 3, the turbine controller 24 may generally comprise as any suitable processing unit configured to perform the methods, steps, operations, calculations and the like described herein. Thus, in several embodiments, the turbine controller 24 may include suitable computer-readable instructions that, when implemented, configure the controller 24 perform various different actions, such as transmitting and executing wind turbine control signals and/or commands.

By transmitting and executing wind turbine control signals and/or commands, the turbine controller 24 may generally be configured to control the various operating modes (e.g., start-up or shut-down sequences) and/or components of the wind turbine 10. For example, the controller 24 may be configured to control the blade pitch or pitch angle of each of the rotor blades 22 (i.e., an angle that determines a perspective of the rotor blades 22 with respect to the direction 26 of the wind) to control the load and power output generated by the wind turbine 10 by adjusting an angular position of at least one rotor blade 22 relative to the wind. For instance, the turbine controller 24 may control the pitch angle of the rotor blades 22, either individually or simultaneously, by transmitting suitable control signals/commands to a pitch drive or pitch adjustment mechanism 46 (FIG. 2) of the wind turbine. Specifically, the rotor blades 22 may be rotatably mounted to the hub 20 by one or more pitch bearing(s) (not illustrated) such that the pitch angle may be adjusted by rotating the rotor blades 22 along their longitudinal axes 28 using the pitch adjustment mechanism 46. Further, as the direction 26 of the wind changes, the turbine controller 24 may be configured to control a yaw direction of the nacelle 16 about a yaw axis 30 to position the rotor blades 22 with respect to the direction 26 of the wind, thereby controlling the load and power output generated by the wind turbine 10. For example, the turbine controller 24 may be configured to transmit control signals/ commands to a yaw drive mechanism 44 (FIG. 2) of the wind turbine 10 such that the nacelle 16 may be rotated about the yaw axis 30.

Figure 2:
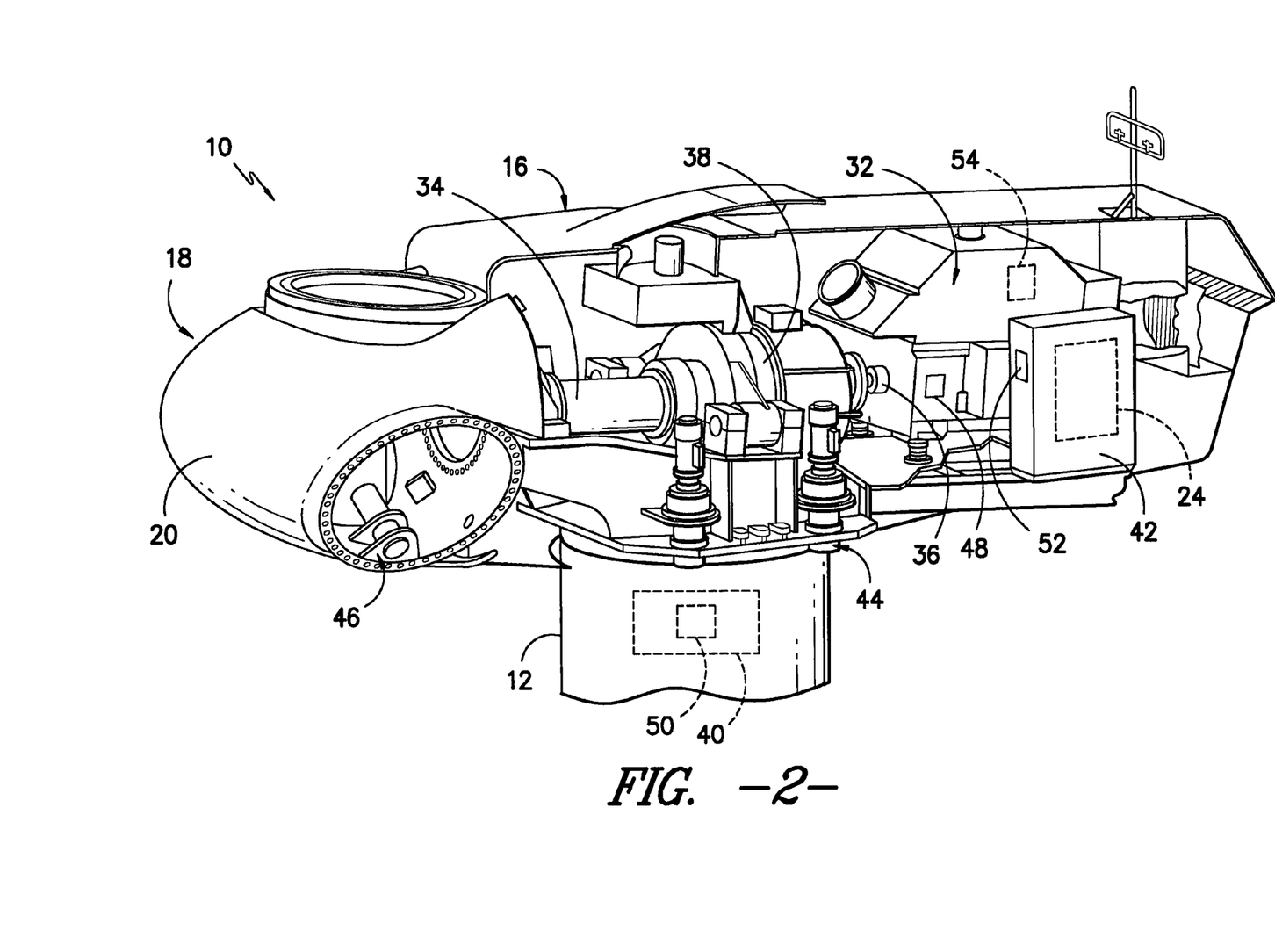
FIG. 2 illustrates a perspective, interior view of one embodiment of a nacelle of a wind turbine.

Referring now to FIG. 2, a simplified, internal view of one embodiment of the nacelle 16 of the wind turbine 10 is illustrated. As shown, a generator 32 may be disposed within the nacelle 16. In general, the generator 32 may be coupled to the rotor 18 of the wind turbine 10 for generating electrical power from the rotational energy generated by the rotor 18. For example, the rotor 18 may include a rotor shaft 34 coupled to the hub 20 for rotation therewith. The generator 32 may then be coupled to the rotor shaft 34 such that rotation of the rotor shaft 34 drives the generator 32. For instance, in the illustrated embodiment, the generator 32 includes a generator shaft 36 rotatably coupled to the rotor shaft 34 through a gearbox 38. However, in other embodiments, it should be appreciated that the generator shaft 36 may be rotatably coupled directly to rotor shaft 34. Alternatively, the generator 32 may be directly rotatably coupled to rotor shaft 34 (often referred to as a "direct-drive wind turbine").

In several embodiments, during operation of the wind turbine 10, the torque of the rotor 18 drives the generator 32 such that a variable frequency AC electrical power may be generated from the rotation of the rotor 18. In such embodiments, a frequency converter unit 40 may be electrically coupled to the generator 32 for converting the variable frequency AC power to a fixed frequency AC power. In general, the frequency converter unit 40 may be located at any suitable location within the wind turbine 10 or at a suitable location remote to the wind turbine 10. However, as shown in the illustrated embodiment, the frequency converter unit 40 may be located within the tower 12 of the wind turbine 10, such as by being located within a down tower assembly of the wind turbine 10.

Additionally, as indicated above, the turbine controller 24 may also be located within the nacelle 16 of the wind turbine 10. For example, as shown in the illustrated embodiment, the turbine controller 24 is disposed within a control cabinet 42 mounted to a portion of the nacelle 16. However, in other embodiments, the turbine controller 24 may be disposed at any other suitable location on and/or within the wind turbine 10 or at any suitable location remote to the wind turbine 10. Moreover, as described above, the turbine controller 24 may also be communicatively coupled to various components of the wind turbine 10 for generally controlling the wind turbine and/or such components. For example, the turbine controller 24 may be communicatively coupled to the yaw drive mechanism 44 of the wind turbine 10 for controlling and/or altering the yaw direction of the nacelle 16 relative to the direction 26 (FIG. 1) of the wind. Similarly, the turbine controller 24 may also be communicatively coupled to each pitch adjustment mechanism 46 of the wind turbine 10 (one of which is shown) for controlling and/or altering the pitch angle of the rotor blades 22 relative to the direction 26 of the wind. For instance, the turbine controller 24 may be configured to transmit a control signal/command to the pitch adjustment mechanism 46 such that one or more actuators (not shown) of the pitch adjustment mechanism 46 may be utilized to rotate the blades 22 relative to the hub 20.

Additionally, the wind turbine 10 may also include a plurality of sensors for detecting, sensing and/or measuring one or more operating parameters and/or operating conditions of the wind turbine 10. Thus, in several embodiments, the wind turbine 10 may include one or more temperature sensors 48, 50, 52 for detecting, sensing and/or measuring the operating temperatures of one or more of the components of the wind turbine 10. As used herein, the term "operating temperature" may refer to the internal temperature of a wind turbine component, the surface temperature of a wind turbine temperature, the ambient temperature of the air surrounding a wind turbine component and/or any other suitable temperature measurement associated with a wind turbine component. For example, as shown in FIG. 2, a temperature sensor 48 may be mounted to and/or disposed within the generator 32 for determining the operating temperature of the generator 32. Similarly, temperature sensors 50, 52 may be mounted to and/or disposed within the frequency converter unit 40 and/or the control cabinet 42 for determining the operating temperature of the frequency converter unit 40 and/or the control cabinet 42 (and/or turbine controller 24), respectively. It should be appreciated that various other temperature sensors 48, 50, 52 may be disposed at other suitable locations within the wind turbine 10, such as at suitable locations within the nacelle 16, tower 12, hub 20 and/or rotor blades 22, in order to permit measurements of component operating temperatures to be obtained.

In general, the temperature sensors 48, 50, 52 may comprise any suitable sensors and/or other sensing devices known in the art for detecting, sensing and/or measuring the temperature of an object and/or the temperature of the air surrounding the object. For example, suitable temperature sensors 48, 50, 52 may include, but are not limited to, thermocouples, thermometers, thermistors, resistance temperature detectors, fiber optic temperature sensors, semiconductor temperature sensors, pyrometers, thermal imagers and/or the like.

Moreover, in several embodiments, the wind turbine 10 may also include one or more sensors 54 for detecting, sensing and/or measuring the electrical power output of the generator 32. It should be appreciated that such sensor(s) 54 may generally be disposed at any suitable location within or remote to the wind turbine 10 that permits the sensor(s) 54 to provide data relating to the power output of the generator 32. For example, as shown in FIG. 2, the sensor(s) 54 may be disposed within a portion of the generator 32. It should also be appreciated that suitable sensors 54 for detecting, sensing and/or measuring the electrical power output of the generator 32 may include, but are not limited to, Hall effect current transducers and/or capacitive voltage transducers.

In further embodiments, the wind turbine 10 may also include various other sensors for detecting, sensing and/or measuring one or more operating parameters and/or operating conditions of the wind turbine 10. For example, the wind turbine 10 may include sensors for detecting, sensing and/or measuring the pitch angle of each rotor blade 22, the speed of the rotor shaft 34, the torque on the rotor shaft 34, the torque on the generator shaft 36, the ambient air pressure, the ambient air humidity and/or other ambient conditions and/or operational parameters of the wind turbine 10.

Figure 3:
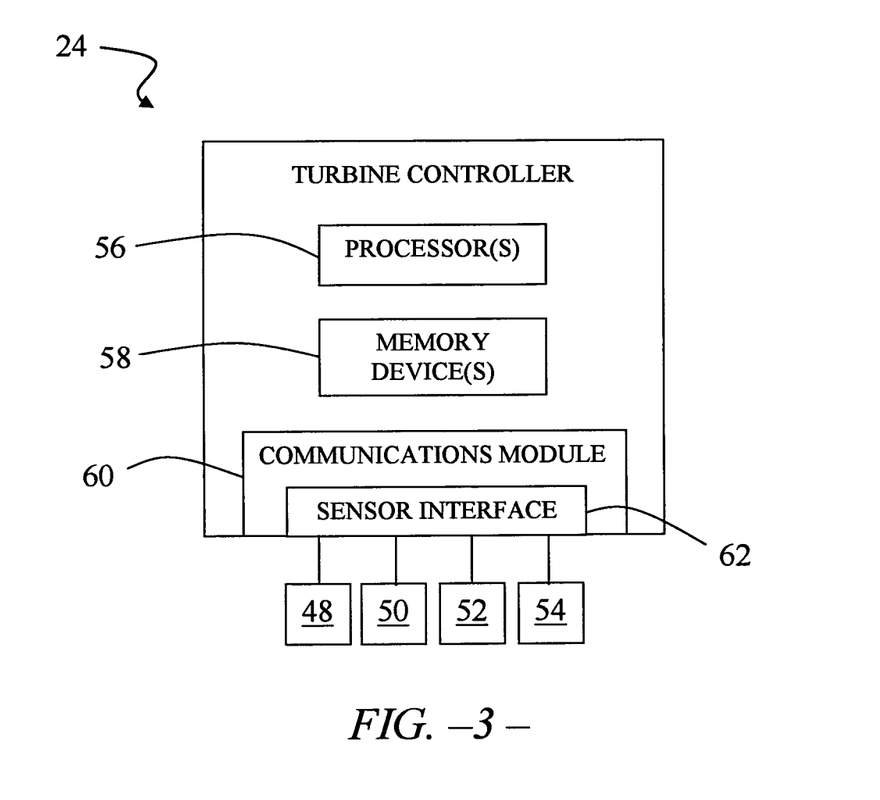
FIG. 3 illustrates a schematic diagram of one embodiment of a turbine controller of a wind turbine in accordance with aspects of the present subject matter.

Referring now to FIG. 3, there is illustrated a block diagram of one embodiment of the turbine controller 24. In general, the turbine controller 24 may comprise a computer or any other suitable processing unit. Thus, in several embodiments, the turbine controller 24 may include one or more processor(s) 56 and associated memory device(s) 58 configured to perform a variety of computer-implemented functions (e.g., performing the methods, steps, operations, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 of the turbine controller 24 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 56 of the turbine controller 24, configure the turbine controller 24 to perform various functions including, but not limited to, executing algorithms stored on the memory device(s) 58, determining output data based on operating parameters and other input variables provided to the turbine controller 24 and/or the like. The memory device(s) 58 may also be used to store temporary input and output variables and other immediate information during execution by the processor(s) 56 of the computer-readable instructions.

Additionally, as shown, the turbine controller 24 may also include a communications module 60 to facilitate communication between the turbine controller 24 and the various components of the wind turbine 10. In several embodiments, the communications module 60 may include a sensor interface 62 to permit the sensors 48, 50, 52, 54 of the wind turbine 10 to transmit output data (e.g., operating temperature measurements, power output measurements and the like) to the turbine controller 24. Thus, as shown, each sensor 48, 50, 52, 54 may be communicatively coupled to the turbine controller 24 through the sensor interface 62. For instance, in one embodiment, the sensors 48, 50, 52, 54 may be communicatively coupled to the sensor interface 62 through a wired connection, such as by coupling the sensors 48, 50, 52, 54 to the sensor interface 62 through a cable or other suitable communicative link. Alternatively, the sensors 48, 50, 52, 54 may be communicatively coupled to the sensor interface 62 through a wireless connection. For example, each sensor 48, 50, 52, 54 may be equipped with a suitable antenna for transmitting output data to the turbine controller 24 through any suitable wireless communications protocol. In such an embodiment, the communications module 60 may also include a suitable antenna for receiving the data transmissions and/or for otherwise wirelessly communicating with the sensors 48, 50, 52, 54.

It should be appreciated that a suitable sensor interface 62 may include, for instance, one or more analog-to-digital converters configured to convert analog signals into digital signals that can be used by the processor(s) 56 of the turbine controller 24.

Figure 4:
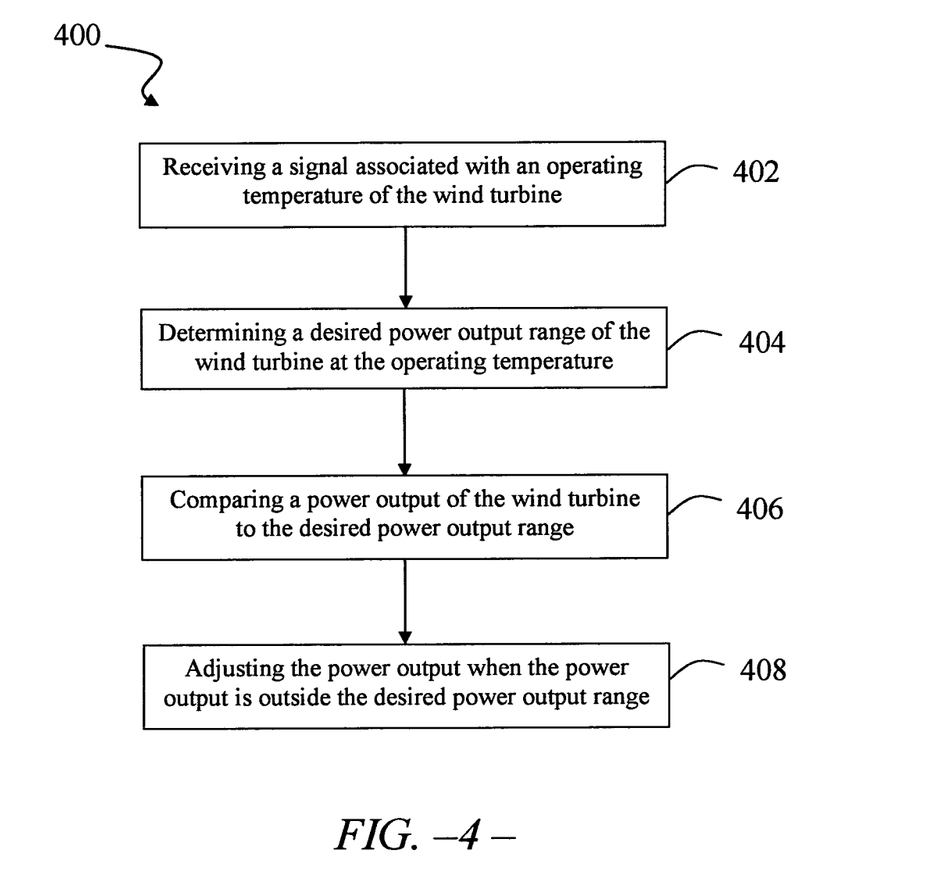
FIG. 4 illustrates a flow diagram of one embodiment of a method for adjusting the power output of a wind turbine based on component operating temperatures in accordance with aspects of the present subject matter.

Referring now to FIG. 4, there is illustrated a simplified flow diagram of one embodiment of a method 400 for adjusting the power output of a wind turbine 10 based on component operating temperatures. As shown, the disclosed method 400 generally includes receiving a signal associated with an operating temperature of the wind turbine 402, determining a desired power output range of the wind turbine at the operating temperature 404, comparing a power output of the wind turbine to the desired power output range 406 and adjusting the power output when the power output is outside the desired power output range 408. It should be appreciated that, although the various method elements 402, 404, 406, 408 of the disclosed method 400 are illustrated in a particular order in FIG. 4, the method elements 402, 404, 406, 408 may generally be performed in any sequence and/or order consistent with the disclosure provided herein.

In general, the disclosed method 400 may permit the power output of the wind turbine 10 to be controlled based on the measured operating temperature(s) of one or more of the components of the wind turbine 10. For example, the operating temperature of a wind turbine component may be continuously monitored (e.g., using the temperature sensors 48, 50, 52) and compared to a predetermined alarm temperature so as to provide a means for determining when such wind turbine component may be overheating. If it is determined that the operating temperature of the wind turbine component has exceeded the predetermined alarm temperature, the power output of the wind turbine 10 may then be reduced to allow for a reduction in the operating temperature of the component. For example, the operating temperature of the generator 32 may be continuously monitored (e.g., using temperature sensor 48) and compared to a predetermined generator alarm temperature. When the operating temperature of the generator 32 exceeds the generator alarm temperature, the power output of the wind turbine 10 may be reduced, thereby allowing the generator 32 to cool down. As the operating temperature of the generator 32 decreases, the power output of the wind turbine 10 may then be correspondingly increased to enhance the operating efficiency of the wind turbine 100.

In several embodiments, the various method elements of the disclosed method 400 may be performed by the turbine controller 24. For example, as indicated above, the turbine controller 24 may be communicatively coupled to the temperature sensors 48, 50, 52 and, thus, may be configured to receive a signal from such sensors 48, 50, 52 associated with an operating temperature measurement of the wind turbine 10. Additionally, as will be described below, the turbine controller 24 may also be provided with suitable software instructions that, when implemented, configure the turbine controller 24 to automatically determine a desired power output range, $P_{RANGE}$ (FIGS. 6-8) of the wind turbine 10, compare the power output of the wind turbine 10 to the desired power output range, $P_{RANGE}$, and adjust the power output when it falls outside the desired power output range, $P_{RANGE}$. However, it should be appreciated that, in alternative embodiments, the disclosed method 400 may be performed by a separate processing unit that is communicatively coupled to the turbine controller 24, such as through a wired or wireless connection.

Figure 5:
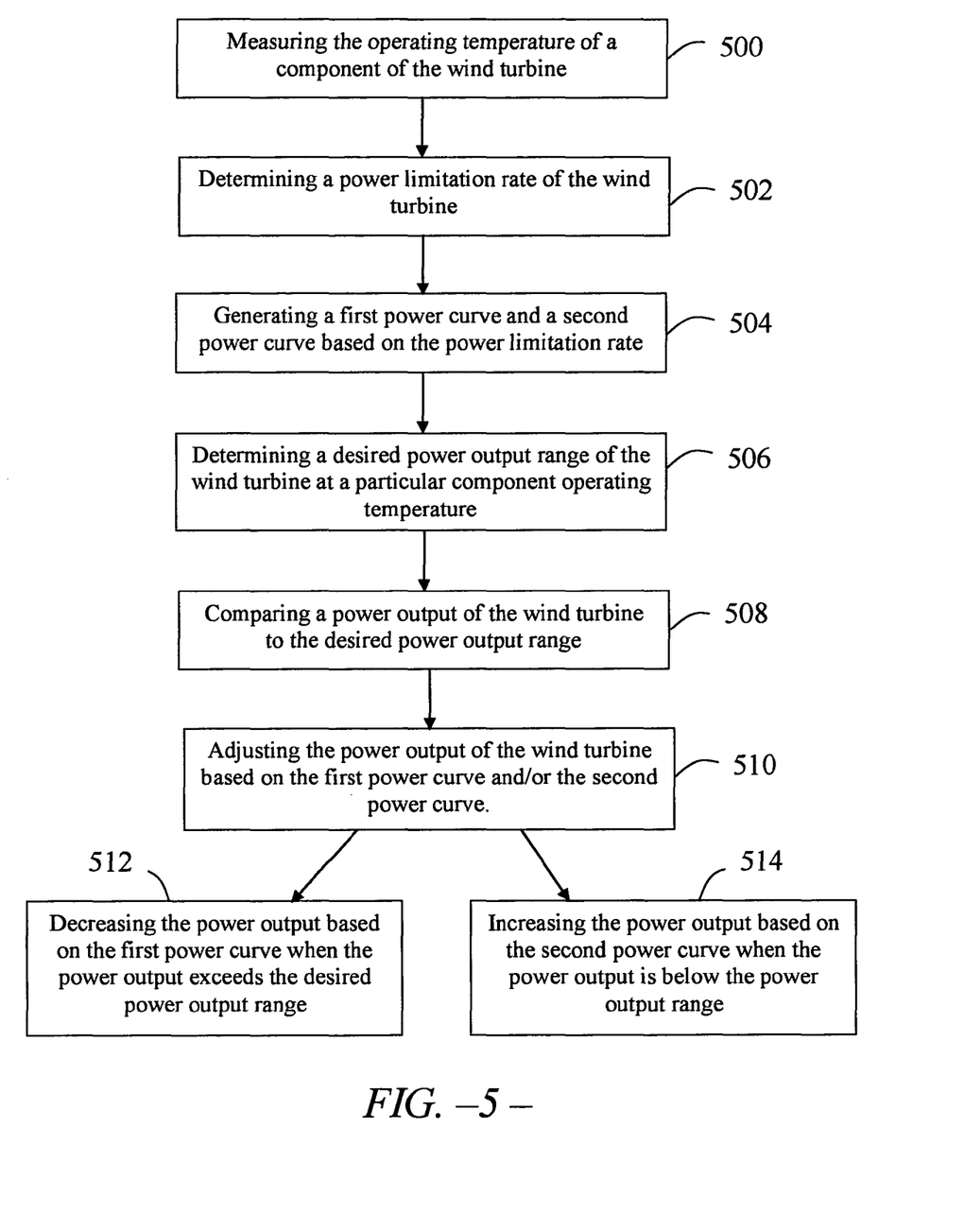
FIG. 5 illustrates a detailed flow diagram of various method elements that may be utilized in performing one or more embodiments of the methods disclosed herein in accordance with aspects of the present subject matter.

Referring now to FIG. 5, there is illustrated a detailed flow diagram of various method elements 500, 502, 504, 506, 508, 510, 512, 514 that may be utilized in performing one or more embodiments of the methods disclosed herein, including the embodiment of the method 400 shown in FIG. 4. It should be appreciated that, although the various method elements 500, 502, 504, 506, 508, 510, 512, 514 are illustrated in a particular order, the elements 500, 502, 504, 506, 508, 510, 512, 514 may generally be performed in any sequence and/or order consistent with the disclosure provided herein. It should also be appreciated that the disclosed methods may also include additional method elements not illustrated in FIG. 4 or 5.

As shown in FIG. 5, in 500, the operating temperature of a component of the wind turbine 10 may be measured. As indicated above, a plurality of temperature sensors 48, 50, 52 may be disposed at numerous locations within the wind turbine 10 to permit measurements of the operating temperatures of the various wind turbine components to be obtained by the turbine controller 24. For example, the operating temperature measurements may correspond to the operating temperatures of the generator 32, frequency converter unit 40, the control cabinet 42 and/or any other suitable component of the wind turbine 10.

In 502, a power limitation rate (FIGS. 6-8) of the wind turbine 10 may be determined. In general, the power limitation rate may correspond to the rate at which the power output of the wind turbine 10 is to be adjusted based on increases and/or decreases in the operating temperature of the particular wind turbine component being monitored (e.g., the generator 32, frequency convertor unit 40, control cabinet 42 and/or any other suitable component of the wind turbine 10). Thus, in one embodiment, the power limitation rate may be equal to the change in power output of the wind turbine 10 over the change in measured operating temperature of a particular wind turbine component.

In several embodiments, the turbine controller 24 of the wind turbine 10 may be provided with software instructions including suitable formulas and/or algorithms that, when implemented, configure the turbine controller 24 to automatically determine the power limitation rate as a function of one or more operating parameters, conditions and/or data of the wind turbine 10. For example, in one embodiment, formulas and/or algorithms may be developed that allow the turbine controller 24 to automatically determine the power limitation rate as a function of the operating temperature measurements provided by the temperature sensors 48, 50, 52 and/or a component life curve of the wind turbine 10. A component life curve may generally correspond to the predicted or actual operating life of a particular wind turbine component based on the component's operating temperature over time. Thus, the component life curve of the wind turbine generator 32, for example, may be produced using lookup tables and/or historical data (e.g., condition-based maintenance data) including the operating temperature of the generator 32 (measured by one or more of the temperature sensors 48, 50, 52) over time and relating such changing operating temperatures to the operating and/or component life of the generator 32. In alternative embodiments, the power limitation rate may be determined using any other operating parameters, conditions and/or data that generally provide suitable input variables for establishing the rate at which the power output of the wind turbine 10 is to be adjusted based on the operating temperatures of a component of the wind turbine.

It should be appreciated that the development of suitable formulas and/or algorithms for determining the power limitation rate as a function of one or more operating parameters, conditions, and/or data of the wind turbine 10 is generally within the capability of those skilled in the art, and therefore will not be discussed in any detail herein. Additionally, it should be appreciated that the power limitation rate of the wind turbine 10 need not based on the operating temperature and/or the component life curve of a single wind turbine component. Rather, in several embodiments, the power limitation rate may be based on the operating temperatures and/or component life curves of two or more wind turbine components.

It should also be appreciated that, in alternative embodiments, the power limitation rate need not be determined automatically by the turbine controller 24. For example, in one embodiment, the power limitation rate may be determined by an operator of the wind turbine 10 and may be input into the turbine controller 24 as an input variable. In such an embodiment, the method element 502 of determining the power limitation rate of the wind turbine 10 may simply comprise the turbine controller 24 receiving an input signal associated with the power limitation rate.

Additionally, it should be appreciated that the power limitation rate may correspond to a constant or variable rate. Thus, in one embodiment, the power limitation rate may be continuously changed and/or updated depending on, for example, the operating temperature and/or the component life curve of the component being monitored.

Figure 6:
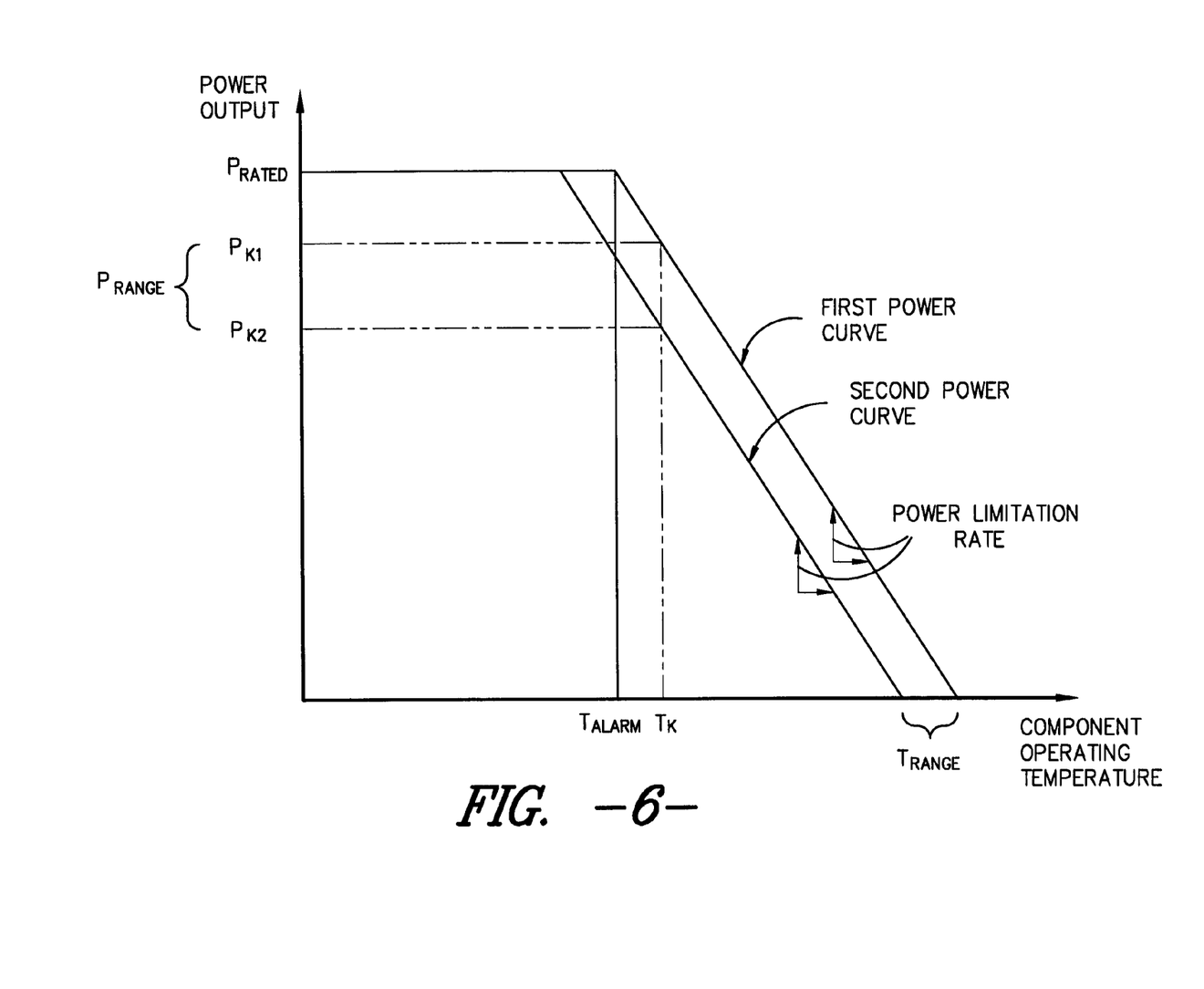
FIG. 6 illustrates one embodiment of a component graph having first and second power curves plotting the power output of the wind turbine versus the operating temperature of a wind turbine component in accordance with aspects of the present subject matter.
Figure 7:
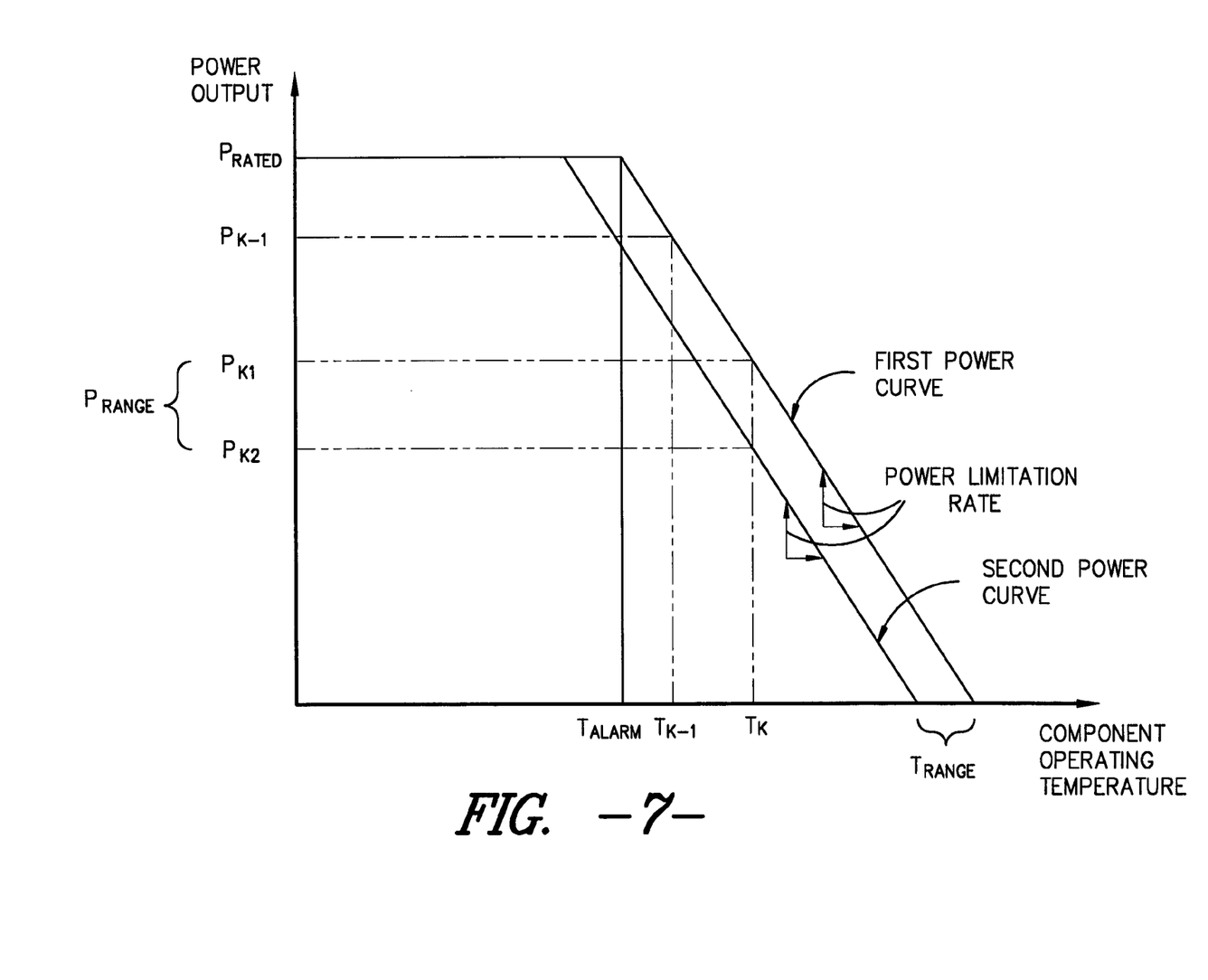
FIG. 7 illustrates the component graph shown in FIG. 6, wherein a currently measured operating temperature, $T_K$, and a previously measured operating temperature, $T_{K-1}$, are identified in accordance with aspects of the present subject matter; and, FIG. 8 illustrates the component graph shown in FIG. 6, wherein a currently measured operating temperature, $T_K$, and a previously measured operating temperature, $T_{K-1}$, are identified in accordance with aspects of the present subject matter.
Figure 8:
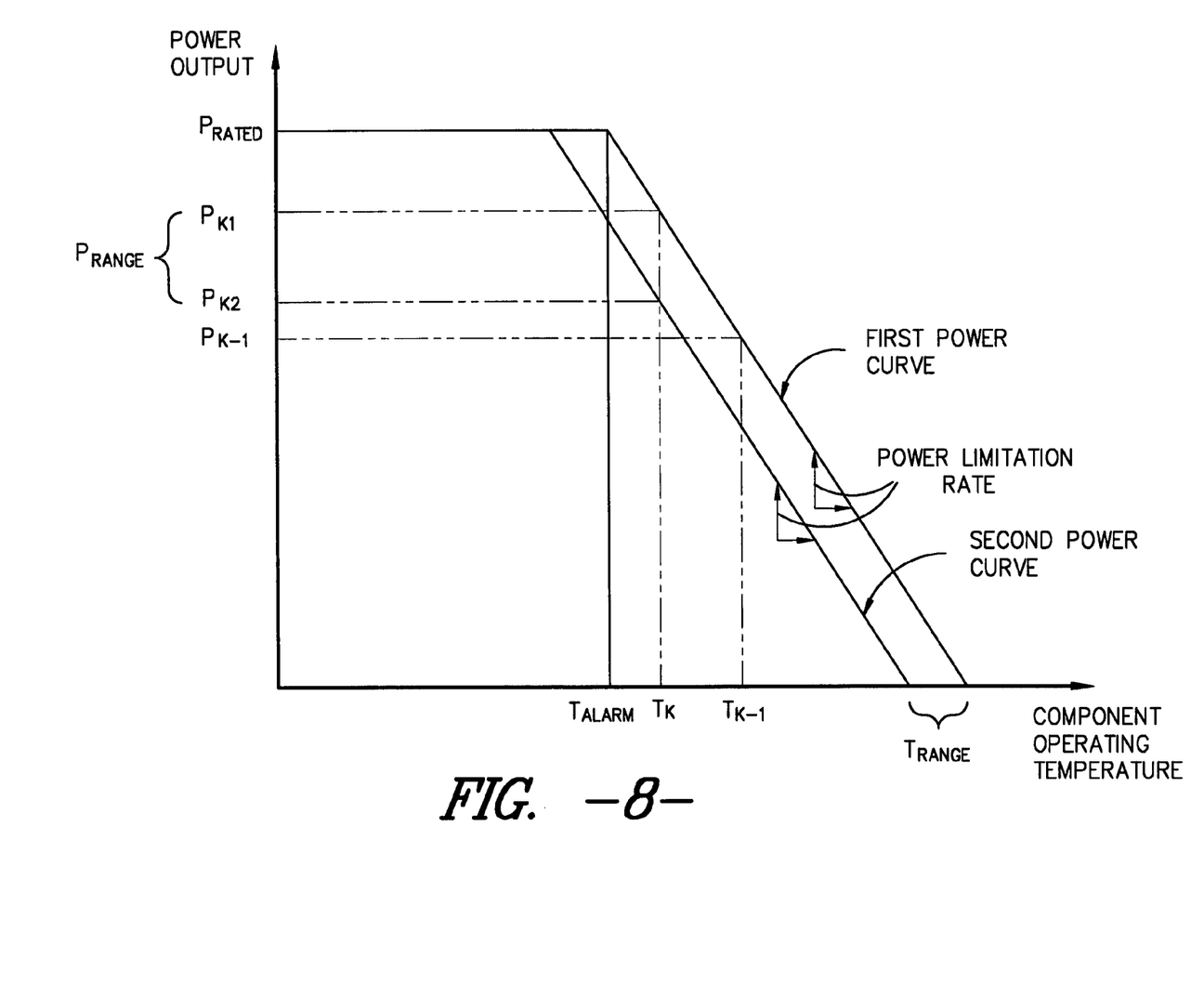

Referring still to FIG. 5, in 504, the power limitation rate may be used to generate a first power curve and a second power curve (FIGS. 6-8). As indicated above, the power limitation rate may generally correspond to the rate at which the power output of the wind turbine 10 is to be adjusted based on increases and/or decreases in the operating temperature of a particular wind turbine component. Thus, in several embodiments, the first and second power curves may be generated as a function of power output and component operating temperature using straight-line equations (e.g., the slope-intercept formula y=mx+b), wherein the power limitation rate corresponds to the slope of the first and second power curves. As such, the first and second power curves may generally provide a linear correlation between the power output of the wind turbine and the component operating temperatures, thereby providing a means for adjusting the power output based on changes to the operating temperature of a particular wind turbine component so as to prevent such component from being damaged due to overheating.

For example, FIGS. 6-8 illustrate various embodiments of component graphs showing first and second power curves that may be generated by the turbine controller 24 in order to correlate the power output of the wind turbine 10 to the operating temperatures of a wind turbine component. As shown, the first power curve may generally be generated as a function of the determined power limitation rate, the rated power output of the generator 32, $P_{RATED}$, and a predetermined alarm temperature, $T_{ALARM}$, for the particular wind turbine component be monitored. Specifically, by inputting the rated power output, $P_{RATED}$, and the alarm temperature, $T_{ALARM}$, into the turbine controller 24 as initial x and y coordinates ($T_{ALARM}$, $P_{RATED}$), the first power curve may be generated by utilizing the power limitation rate as the slope of the curve.

For instance, using the frequency converter unit 40 of the wind turbine 10 as an example, a suitable power limitation rate may be determined based on the measured operating temperatures of the frequency converter unit 40 and/or the component life curve of the frequency converter unit 40. In addition, the alarm temperature, $T_{ALARM}$, for the frequency converter unit 40 and the rated power output of the generator 32, $P_{RATED}$, may be stored within the turbine controller 24 as input variables. As a result, the turbine controller 24 may be configured to generate the first power curve so as to relate the power output of the wind turbine 10 to the operating temperatures of the frequency converter unit 40.

It should be appreciated that the alarm temperature, $T_{ALARM}$, for a particular wind turbine component may generally correspond to any suitable predetermined temperature value. However, in several embodiments, the alarm temperature, $T_{ALARM}$, may correspond to a maximum temperature value at which the particular wind turbine component may be operated without being subject to damage due to overheating.

Additionally, in several embodiments, the second power curve may be generated as function of the first power curve. For example, as indicated above, the power limitation rate may generally correspond to the slope of both the first and second power curves. Thus, as shown in FIGS. 6-8, the second power curve may extend parallel to the first power curve and may be generated by offsetting the second power curve from the first power curve by a predetermined temperature range, $T_{RANGE}$. In general, the predetermined temperature range, $T_{RANGE}$, may correspond to any suitable temperature range. However, in several embodiments, the predetermined temperature range, $T_{RANGE}$, may be chosen in order to tailor the sensitivity of the turbine controller 24 in making adjustments to the power output based on changes to the component operating temperatures. For instance, as will be described below, the first and second power curves may be utilized to determine a desired power output range, $P_{RANGE}$, of the wind turbine 10 at a particular component operating temperature. Accordingly, the spacing between the first and second power curves (i.e., the predetermined temperature range, $T_{RANGE}$,) may have a direct effect on the desired power output range, $P_{RANGE}$. Specifically, as the predetermined temperature range, $T_{RANGE}$, is decreased, the desired power output range, $P_{RANGE}$, is correspondingly decreased, thereby configuring the turbine controller 24 to make adjustments to the power output based on smaller operating temperature changes.

Referring to FIGS. 5 and 6, in 506, a desired power output range, $P_{RANGE}$, of the wind turbine 10 may be determined at a particular component operating temperature. The desired power output range, $P_{RANGE}$, may generally correspond to a range of suitable power output values to which the power output of the wind turbine 10 may be adjusted in order to avoid damage to a wind turbine component having an operating temperature that exceeds the component's alarm temperature, $T_{ALARM}$. Specifically, as shown in FIG. 6, at component operating temperatures at or below the alarm temperature, $T_{ALARM}$, the wind turbine 10 may be operated at the rated power output of the generator 32, $P_{RATED}$, without risk of damage to the wind turbine component being monitored. However, when the component operating temperature exceeds the alarm temperature, $T_{ALARM}$, further operation of the wind turbine 10 at the rated power output, $P_{RATED}$, may subject the wind turbine component to damage. Thus, in several embodiments, the desired power output range, $P_{RANGE}$, may be determined based on the first and second power curves so as to correlate the component operating temperature to a suitable range of power output values. For example, as shown in FIG. 6, when the current component operating temperature, $T_K$, exceeds the alarm temperature, $T_{ALARM}$, the desired power output range, $P_{RATED}$, may correspond to the range of power output values between the first and second power curves at the such operating temperature, $T_K$. Specifically, in the illustrated embodiment, the power output value, $P_{K1}$, of the first power curve at the current component operating temperature, $T_K$, may correspond to a maximum power output value of the desired power output range, $P_{RANGE}$, and the power output value, $P_{K2}$, of the second power curve at the current component operating temperature, $T_K$, may correspond to a minimum power output value of the desired power output range, $P_{RANGE}$.

Once the desired power output range, $P_{RANGE}$, has been determined, the actual power output of the wind turbine 10 may then be compared to the desired output range, $P_{RANGE}$, (method element 508 of FIG. 5) and adjusted based on the first power curve and/or the second power curve (method element 510 of FIG. 5). Specifically, as indicated above, the wind turbine 10 may include one or more sensors 54 (FIG. 2) configured to detect, sense and/or measure the power output of the generator 32 and transmit such data to the turbine controller 24. Thus, in several embodiments, the turbine controller 24 may be provided with suitable software instructions that, when implemented, configure the controller 24 to compare the power output measurements provided by the sensor(s) 54 to the desired power output range, $P_{RANGE}$. In such embodiments, if the turbine controller 24 determines that the actual power output of the wind turbine 10 exceeds the desired power output range, $P_{RANGE}$, (e.g., due to an increase in the component operating temperature), the turbine controller 24 may be configured to reduce the power output of the wind turbine 10 according to the first power curve (e.g., by reducing the power output to the power output value, $P_{K1}$) to prevent damage to wind turbine component being monitored (method element 512 of FIG. 5). Similarly, if the turbine controller 24 determines that the actual power output of the wind turbine 10 is below the desired power output range, $P_{RANGE}$, (e.g., due to a decrease in the component operating temperature), the turbine controller 24 may be configured to increase the power output of the wind turbine 10 according to the second power curve (e.g., by increasing the power output to the power output value, $P_{K2}$) to enhance the operating efficiency of the wind turbine 10 (method element 514 of FIG. 5).

For example, as shown in FIG. 6, the currently measured operating temperature, $T_K$, indicates that the operating temperature of the wind turbine component being monitored exceeds its corresponding alarm temperature, $T_{ALARM}$. By using the first and second power curves, the desired power output range, $P_{RANGE}$, for such operating temperature may then be determined and compared to the actual power output of the wind turbine 10. Thus, assuming for purposes of example that the wind turbine 10 is operating at the rated power output of the generator 32, $P_{RATED}$, the actual power output of the wind turbine 10 exceeds the maximum power output valve, $P_{K1}$, of the desired power output range, $P_{RANGE}$, thereby indicating that the component operating temperature has increased beyond the alarm temperature, $T_{ALARM}$. As a result, the power output of the wind turbine 10 may be adjusted downwards according to the first power curve (e.g., by reducing the power output to the power output value, $P_{K1}$) to allow the operating temperature of the component being monitored to be reduced.

It should be appreciated that, upon making an adjustment to the power output of the wind turbine 10, the component operating temperature may be continuously monitored to determine if further adjustments may be necessary. For instance, FIG. 7 illustrates an example in which the currently measured operating temperature, $T_K$, indicates that the operating temperature of the component being monitored has further increased from the operating temperature measurement shown in FIG. 6 (now $T_{K-1}$). Thus, using the first and second power curves, the desired power output range, $P_{RANGE}$, for the current operating temperature, $T_K$, may be determined and compared to the actual power output (now $P_{K-1}$) of the wind turbine 10. As shown, the actual power output, $P_{K-1}$, exceeds the maximum power output valve, $P_{K1}$, of the desired power output range, $P_{RANGE}$. As a result, the power output of the wind turbine 10 may be further adjusted downwards according to the first power curve (e.g., by reducing the power output to the power output value, $P_{K1}$) to effect a reduction in the operating temperature of the component being monitored.

It should also be appreciated that, as the component operating temperature is reduced and moves closer to the alarm temperature, $T_{ALARM}$, the power output of the wind turbine 10 may be correspondingly increased to enhance the efficiency of the wind turbine 10. For instance, FIG. 8 illustrates an example in which the currently measure operating temperature, $T_K$, indicates that the operating temperature of the component being monitored has decreased relative to the operating temperature measurement shown in FIG. 7 (now $T_{K-1}$). Thus, using the first and second power curves, the desired power output range, $P_{RANGE}$, for the current operating temperature, $T_K$, may be determined and compared to the actual power output (now $P_{K-1}$) of the wind turbine 10. As shown, the actual power output, $P_{K-1}$, is below the minimum power output valve, $P_{K2}$, of the desired power output range, $P_{RANGE}$. Thus, the power output of the wind turbine 10 may be adjusted upwards according to the second power curve (e.g., by increasing the power output to the power output value, $P_{K2}$), as the likelihood of damage to the component being monitored due to overheating has reduced.

It should also be appreciated that the power output of the wind turbine 10 may be adjusted (i.e., increased and/or decreased) using any suitable method, process, structure and/or means known in the art. Thus, in several embodiments, the power output may be adjusted by altering the pitch angle of one or more of the rotor blades 22 of the wind turbine 10. For example, in one embodiment, by decreasing the pitch angle of one or more of the rotor blades 22, the power output of the wind turbine 10 may be increased. Similarly, by increasing the pitch angle of one or more of the rotor blades 22, the power output of the wind turbine 10 may be decreased. As described above, the pitch angle of the rotor blades 22 may be controlled by the turbine controller 24 by transmitting a suitable control signal/command to the pitch adjustment mechanism 46 of the wind turbine 10.

In other embodiments, the power output may be adjusted by controlling a yaw direction of the nacelle 16. For example, the nacelle 16 may be rotated about the yaw axis 30 of the wind turbine 10 to alter the position of the rotor blades 22 relative to the direction 26 of the wind, thereby altering the power output of the wind turbine 10. As described above, the yaw direction of the nacelle 16 may be controlled by the turbine controller 24 by transmitting a suitable control signal/command to the yaw drive mechanism 44 of the wind turbine 10.

In further embodiments, the power output of the wind turbine 10 may be adjusted by modifying the torque on the generator 32. For example, in one embodiment, by decreasing the torque demand on the generator 32, the power output of the wind turbine 10 may be decreased. Similarly, by increasing the torque demand on the generator 32, the power output of the wind turbine 10 may be increased. In general, the toque on the generator 32 may be modified using any suitable method, process, structure and/or means known in the art. For instance, in one embodiment, the torque on the generator 32 may be controlled using the turbine controller 24 by transmitting a suitable control signal/command to the generator 32 in order to modulate the magnetic flux produced within the generator 32.

In even further embodiments, the power output of the wind turbine 10 may be adjusted by performing a combination of two or more of the above described actions, such as by altering the pitch angle of one or more of the rotor blades 22 together with yawing the nacelle 16 or modifying the torque on the generator 32 together with altering the pitch angle of one or more of the rotor blades 22.

It should be appreciated that, although the various method elements disclosed herein were described in the context of monitoring the operating temperature of a single wind turbine component in relation to the power output of the wind turbine 10, the operating temperatures of numerous wind turbine components may be monitored and related to the power output of the wind turbine 10. For example, in several embodiments, power limitation rates, power curves and the like may be determined and/or generated for any number of wind turbine component such that component graphs similar to the graphs shown in FIGS. 6-8 may be generated for each component being monitored. In such embodiments, the desired power output range, $P_{RANGE}$, for each component being monitored may differ. For instance, depending on how each of the components being monitored responds to changing operating temperatures, the power limitation rates for the components may differ significantly, thereby resulting in differing desired power output ranges, $P_{RANGE}$. As a result, it should be appreciated that the suitable algorithms may be developed for determining how to the adjust the power output of the wind turbine 10 based on the differing desired power output ranges, $P_{RANGE}$. For example, in one embodiment, the turbine controller 24 may be configured to consider the component graph for each component being monitored and adjust the power output of the wind turbine 10 to the lowest power output value recommended by the graphs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

COMPONENT LIST

| Reference Character | Component |
| --- | --- |
| 10 | Wind turbine |
| 12 | Tower |
| 14 | Support surface |
| 16 | Nacelle |
| 18 | Rotor |
| 20 | Hub |
| 22 | Rotor Blade |
| 24 | Turbine controller |
| 26 | Direction |
| 28 | Longitudinal axis |
| 30 | Yaw axis |
| 32 | Electric Generator |
| 34 | Rotor shaft |
| 36 | Generator shaft |
| 38 | Gearbox |
| 40 | Frequency converter unit |
| 42 | Control cabinet |
| 44 | Yaw drive mechanism |
| 46 | Adjustment mechanism |
| 48 | Temperature sensors |
| 50 | Temperature sensors |
| 52 | Temperature sensors |
| 54 | Sensors |
| 56 | Processor(s) |
| 58 | Memory device |
| 60 | Communications module |
| 62 | Sensor interface |
| 100 | Wind turbine |
| 400 | Method |
| 402 | Method elements |
| 404 | Method elements |
| 406 | Method elements |
| 408 | Method elements |
| 500 | Method elements |
| 502 | Method elements |
| 504 | Method elements |
| 506 | Method elements |
| 508 | Method elements |
| 510 | Method elements |
| 512 | Method elements |
| 514 | Method elements |

What is claimed is:

1. A method for adjusting the power output of a wind turbine based on component operating temperatures, the method comprising:
    receiving a signal associated with an operating temperature of the wind turbine;
    generating a first power curve and a second power curve for the wind turbine, each of the first and second power curves providing a correlation between the operating temperature and a power output of the wind turbine;
    determining a desired power output range of the wind turbine at the operating temperature based on the first and second power curves;
    comparing the power output of the wind turbine to the desired power output range; and,
    adjusting the power output when the power output is outside the desired power output range.

2. The method of claim 1, further comprising:
    determining a power limitation rate for the wind turbine; and,
    generating the first and second power curves based on the power limitation rate.

3. The method of claim 2, wherein the desired power output range corresponds to a range of power output values between the first power curve and the second power curve at the operating temperature.

4. The method of claim 2, wherein the power limitation rate is determined based on at least one of the operating temperature and a component life curve of the wind turbine.

5. The method of claim 2, wherein the power limitation rate corresponds to a rate at which a power output of the wind turbine is to be adjusted based on changes in an operating temperature of the wind turbine.

6. The method of claim 2, wherein the power limitation rate corresponds to a slope of the first power curve and the second power curve.

7. The method of claim 1, wherein the operating temperature corresponds to a component operating temperature of a component of the wind turbine.

8. The method of claim 1, wherein adjusting the power output when the power output is outside the desired power output range comprises decreasing the power output when the power output exceeds the desired power output range or increasing the power output when the power output is below the desired power output range.

9. The method of claim 1, wherein adjusting the power output of the wind turbine when the power output is outside the desired power output range comprises at least one of adjusting a pitch angle of at least one rotor blade of the wind turbine, adjusting a yaw direction of a nacelle of the wind turbine or adjusting a torque acting on a generator of the wind turbine.

10. The method of claim 1, wherein the operating temperature corresponds to a component operating temperature of the wind turbine, wherein adjusting the power output of the wind turbine comprises pitching at least one rotor blade of the wind turbine in order to decrease the power output of the wind turbine when the power output exceeds the desired power output range go as to reduce the monitored component operating temperature.

11. A method for adjusting the power output of a wind turbine based on component operating temperatures, the method comprising:
    determining a power limitation rate for the wind turbine, the power limitation rate corresponding to a rate at which a power output of the wind turbine is to be adjusted based on changes in an operating temperature of the wind turbine;
    generating a first power curve and a second power curve based on the power limitation rate, the first and second power curves providing a correlation between the operating temperature and the power output of the wind turbine; and, adjusting the power output of the wind turbine based on at least one of the first power curve or the second power curve.

12. The method of claim 11, further comprising:
receiving a signal associated with the operating temperature of the wind turbine; and
determining a desired power output range at the operating temperature based on the first power curve and the second power curve.

13. The method of claim 12, wherein the desired power output range corresponds to a range of power output values between the first power curve and the second power curve at the operating temperature.

14. The method of claim 12, further comprising comparing the power output of the wind turbine to the desired power output range.

15. The method of claim 14, wherein adjusting the power output based on at least one of the first power curve or the second power curve comprises decreasing the power output based on the first power curve when the power output exceeds the desired power output range or increasing the power output based on the second power curve when the power output is below the desired power output range.

16. The method of claim 11, wherein adjusting the power output based on at least one of the first power curve or the second power curve comprises at least one of adjusting a pitch angle of at least one rotor blade of the wind turbine, adjusting a yaw direction of a nacelle of the wind turbine or adjusting a torque acting on a generator of the wind turbine.

17. The method of claim 11, wherein the power limitation rate corresponds to a slope of the first power curve and the second power curve.

18. The method of claim 11, wherein the operating temperature corresponds to a component operating temperature of a component of the wind turbine.

19. A method for adjusting the power output of a wind turbine based on component operating temperatures, the method comprising:
receiving a signal associated with an operating temperature of the wind turbine;
determining a power limitation rate for the wind turbine, the power limitation rate providing a relationship between of a power output and the operating temperature of the wind turbine;
generating a first power curve and a second power curve based on the power limitation rate, the power limitation rate corresponding to a slope of the first and second power curves;
determining a desired power output range of the wind turbine at the operating temperature based on the first and second power curves;
comparing a power output of the wind turbine to the desired power output range; and,
adjusting the power output when the power output is outside the desired power output range.

* * * * *